(12) United States Patent
Khoryaev et al.

(10) Patent No.: US 10,652,846 B2
(45) Date of Patent: May 12, 2020

(54) SYSTEMS, METHODS AND DEVICES FOR CELLULAR SYNCHRONIZATION REFERENCES

(71) Applicant: INTEL CORPORATION, Santa Clara, CA (US)

(72) Inventors: Alexey Khoryaev, Nizhny Novgorod (RU); Andrey Chervyakov, Nizhny Novgorod (RU); Sergey Panteleev, Nizhny Novgorod (RU); Dmitry Belov, Nizhny Novgorod (RU); Sergey Sosnin, Zavolzhie (RU)

(*) Notice: Subject to any disclaimer, the term of this patent is extended or adjusted under 35 U.S.C. 154(b) by 129 days.

(21) Appl. No.: 15/742,416

(22) PCT Filed: Mar. 25, 2016

(86) PCT No.: PCT/US2016/024177
§ 371 (c)(1),
(2) Date: Jan. 5, 2018

(87) PCT Pub. No.: WO2017/052687
PCT Pub. Date: Mar. 30, 2017

(65) Prior Publication Data
US 2018/0213498 A1    Jul. 26, 2018

Related U.S. Application Data

(60) Provisional application No. 62/232,371, filed on Sep. 24, 2015.

(51) Int. Cl.
*H04W 56/00* (2009.01)
*H04B 7/26* (2006.01)

(52) U.S. Cl.
CPC ...... *H04W 56/0015* (2013.01); *H04B 7/2684* (2013.01); *H04B 7/2693* (2013.01); *H04W 56/002* (2013.01)

(58) Field of Classification Search
None
See application file for complete search history.

(56) References Cited

U.S. PATENT DOCUMENTS

| 2011/0170465 A1 | 7/2011 | Tavildar et al. |
| 2015/0264588 A1 | 9/2015 | Li et al. |
| (Continued) | | |

FOREIGN PATENT DOCUMENTS

| CN | 102474838 A | 5/2015 |
| EP | 2879322 A | 6/2015 |
| (Continued) | | |

OTHER PUBLICATIONS

PCT/US2016/024177, International Search Report and Written Opinion, dated Jul. 6, 2016, 12 pages.

*Primary Examiner* — Jutai Kao
(74) *Attorney, Agent, or Firm* — Stoel Rivers LLP

(57) ABSTRACT

Cellular (e.g., LTE or UMTS) and global navigation satellite system (GNSS) based technologies can provide ubiquitous and seamless synchronization solution for LTE-based vehicle to everything (V2X) or Proximity Services synchronization (ProSe) services. For example, by using joint GNSS timing references and LTE cellular network timing references for V2X or ProSe system synchronization benefits of using GNSS technologies to improve synchronization procedure for LTE based V2X or ProSe services can be enabled, including: (1) accurate and stable timing, (2) availability of a global and stable timing reference and (3) ability to propagate GNSS timing by user equipment having sufficient GNSS signal quality.

16 Claims, 9 Drawing Sheets

(56) References Cited

U.S. PATENT DOCUMENTS

| | | | |
|---|---|---|---|
| 2015/0319723 A1* | 11/2015 | Korhonen | H04W 56/001 370/350 |
| 2016/0037466 A1* | 2/2016 | Yang | H04W 48/14 370/350 |
| 2016/0374038 A1* | 12/2016 | Wang | H04L 5/0014 |
| 2018/0220388 A1* | 8/2018 | Chae | H04W 4/46 |

FOREIGN PATENT DOCUMENTS

| | | |
|---|---|---|
| EP | 2879322 A1 | 6/2015 |
| WO | 2011011760 A2 | 1/2011 |
| WO | 2014182342 A1 | 11/2014 |
| WO | 2015046264 A1 | 4/2015 |

* cited by examiner

SYSTEMS, METHODS AND DEVICES FOR CELLULAR SYNCHRONIZATION REFERENCES

RELATED APPLICATION

This application is a national stage filing under 35 U.S.C. § 371 of International Patent Application No. PCT/US2016/024177, filed Mar. 25, 2016, which claims the benefit under 35 U.S.C § 119(e) of U.S. Provisional Application No. 62/232,371 filed Sep. 24, 2015, each of which is incorporated by reference herein its entirety.

TECHNICAL FIELD

The present disclosure relates to cellular timing references and more specifically to selecting and prioritizing cellular timing references from network references, global navigation satellite system references and propagated references.

DETAILED DESCRIPTION

Figure 1:
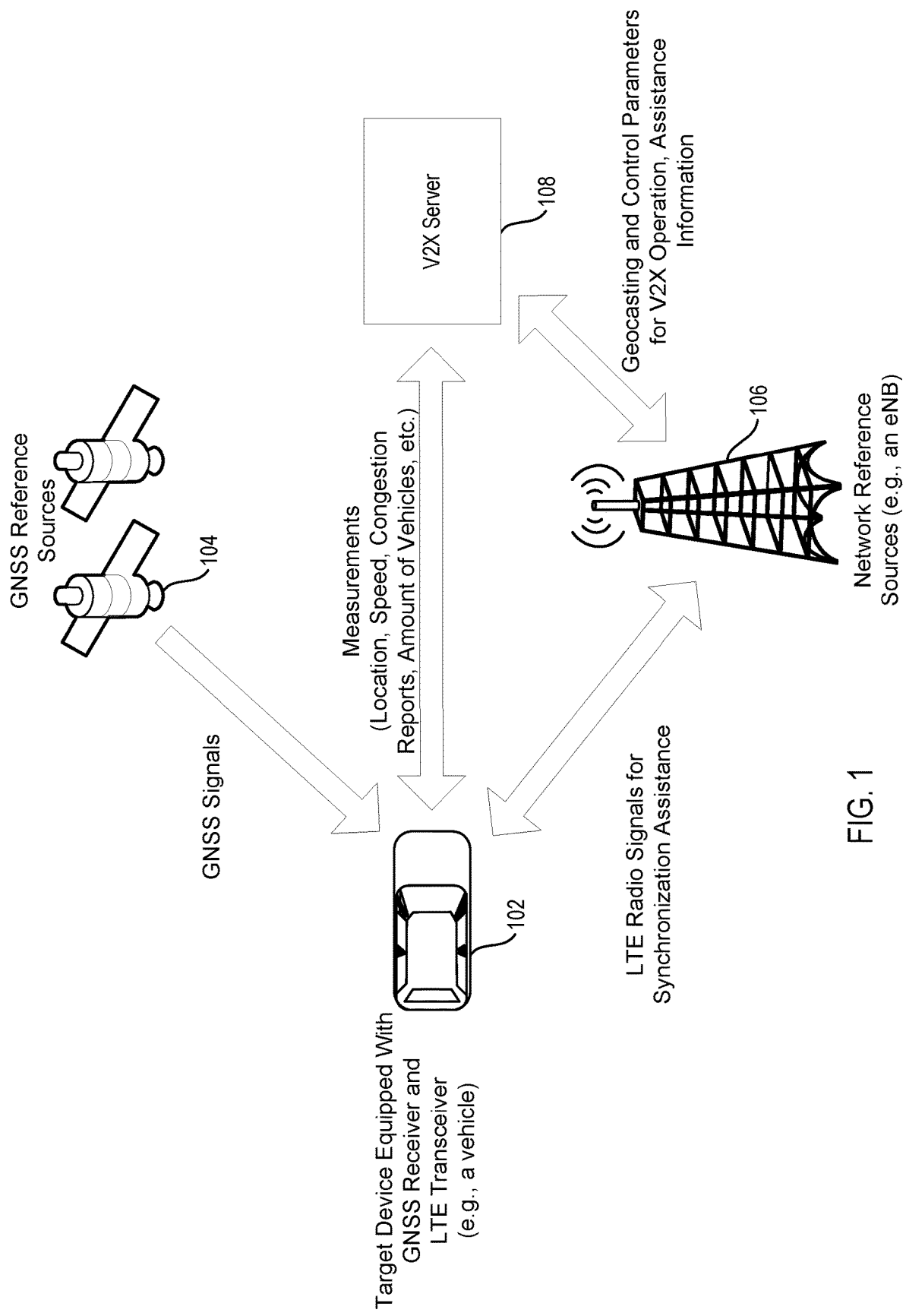
FIG. 1 is a diagram illustrating a navigation reference system consistent with embodiments disclosed herein.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable cellular (e.g., LTE or UMTS) and GNSS based technologies to provide ubiquitous and seamless synchronization solution for LTE-based vehicle-to-everything (V2X) services. For example, by using joint GNSS timing references and LTE cellular network timing references for V2X system synchronization (or Proximity Services synchronization (ProSe)) benefits of using GNSS technologies to improve synchronization procedure for LTE based V2X services can be enabled, including: (1) accurate and stable timing, (2) availability of a global and stable timing reference and (3) ability to propagate GNSS timing by UE terminals having sufficient GNSS signal quality.

It should be noted that when V2X is described, the embodiment can also apply to LTE proximity services (ProSe).

In an example of (1), accurate and stable timing provided by GNSS systems can be used to discipline local oscillators of LTE based V2X terminals (or ProSe terminals) resulting in carrier frequency closer to absolute carrier frequency value and reduce deviation of carrier frequency offset between terminals. Options to enable the timing references include: A) new technical specifications can be defined on frequency offset and stability for V2X terminals equipped with GNSS receivers and/or utilizing GNSS to discipline local oscillators; and/or B) define new specifications on frequency offset for V2X capable terminals without mandating how it is achieved.

In an example of (2), availability of a global and stable timing reference (at least in free space environments when there is no blockage of signal from satellites) can significantly simplify synchronization procedure for V2X operation. For example, synchronization with a network reference, a propagated reference or a GNSS reference would result in a similar timing reference signal.

In an example of (3), GNSS timing can be propagated by UE terminals having sufficient GNSS signal quality (e.g., to a global synchronization reference). In this example, the GNSS signal quality may be defined such that V2X terminal using GNSS for synchronization (e.g., to discipline a local oscillator) to have accurate synchronization and thus may propagate its own timing. Optionally, instead of defining the GNSS signal quality, the synchronization quality may be defined.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, the base station can include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). The UE uses a radio access technology (RAT) to connect to a RAN.

Vehicular communication is a relatively new but rapidly emerging research and development area of wireless communication systems. There is a quite diverse set of applications that can be enabled by Intelligent Transportation Systems (ITS), if wireless technologies are utilized. The range of applications varies from road safety and vehicular traffic management to the applications enabling the vision of "connected car", infotainment and "autonomous driving". The various existing applications and use cases are characterized by very diverse specifications and/or technical boundaries, which can be challenging to satisfy. Moreover, in order to meet these specifications and/or technical boundaries different principles of operation/communication can be applied. The broad range of vehicular system specifications and/or technical boundaries includes multiple challenges associated with the real-time packet delivery (latency), reliability of packet delivery, seamless connectivity and ubiquitous coverage. Besides mandated system specifications and/or technical boundaries, there can be additional technical obstacles associated with the system synchronization, channel propagation conditions (high Doppler), mobility and operation in dense environments. These factors can use a combination of different communication principles to enable efficient support of diverse V2X services.

Recently, the 3GPP initiated study on enhancements of LTE technology to support V2X services. The LTE system may provide a unique advantage for various V2X services, since the technology is being deployed worldwide and thus can provide the ubiquitous coverage and connectivity to V2X applications. In addition, in LTE R.12 the D2D communication and discovery frameworks were integrated enabling direct communication and discovery between UEs. These sidelink frameworks in combination with the traditional cellular LTE operation and assistance from the network side may provide superior performance characteristics in terms of V2X reliability, latency and capacity. However, there are still quite many challenges that can be resolved. One of the main problems that can use an additional enhancement to enable LTE-based V2X solutions is a reliable and accurate synchronization. The LTE Release 12 sidelink synchronization procedure (defined for sidelink communication and discovery) may be not sufficient and can use additional modifications in order to use LTE sidelink air-interface for V2X services, especially in out of coverage scenarios. In particular, the synchronization principles defined for sidelink communication in out of coverage rely on timing propagation by a UE serving as a synchronizations source. In application to mobile V2X environment, the UE based propagation may lead to synchronization convergence issues and frequent re-synchronization procedures reflected in multiple asynchronous areas that may vary in time and space. This may result in unstable system behavior and low performance. In addition, the frequency accuracy and stability of UE oscillators may not be appropriate that will further complicate synchronization process.

Therefore, in order to enable synchronous V2X operation within and out of network coverage scenarios the additional external synchronization sources such as global navigation satellite systems (GNSS) can be used for synchronization in wide deployment areas.

LTE can be enhanced from synchronization perspective to utilize a sidelink air-interface for V2X operation in multiple scenarios. For example, design enhancements can include GNSS based solutions that are applied for LTE based V2X operation.

The basic principle of some embodiments is to use joint cellular (e.g., LTE or UMTS) and GNSS based technologies to provide ubiquitous and seamless synchronization solution for LTE-based V2X services. In particular, we suggest enhancements that should be introduced to LTE sidelink synchronization framework/specification in order to use it for vehicle-to-vehicle (V2V) and V2X communication. An example of such system architecture is shown in FIG. 1.

FIG. 1 shows a target device 102 (e.g., a UE or vehicle) equipped with a GNSS receiver and LTE transceiver. The target device 102 receives GNSS reference signals from GNSS reference sources 104 (e.g., GPS system signals, GLONASS system signals, other GNSS satellites, etc.). The target device 102 also receives LTE radio signals for synchronization assistance from the network (e.g., an eNB, etc.) by a network reference 106. A V2X server 108 can also provide assistance information to the target device. The V2X server 108 can also provide assistance information and geocasting and control parameters for V2X operation to the network reference source 106 (e.g., the eNB). The V2X server 108 can receive measurements (including location, speed, congestion reports, amount of vehicles, etc.) from the target device.

Wide area and seamless synchronization can be enabled in multiple deployment scenarios, including, in network coverage, partial network coverage and out of network coverage. Additional design enhancements and signaling can be defined for V2X applications to enable this synchronization. These enhancements can include (1) information about network (eNBs) and GNSS synchronization status and timing offset information; (2) indication of the alignment of network and GNSS timing to a common global timing reference; and/or (3) GNSS assistance information for V2X terminals.

Enhancement (1) can include information about network (eNBs) and GNSS synchronization status and timing offset information. This status and timing information can include: a level of synchronization in phase, frequency, and/or time; and/or signaling of the timing offset in the granularity of less that cyclic prefix (CP) duration (e.g., 1 microsecond or below) relative to UTC time.

Enhancement (2) can include an indication of the alignment of network and GNSS timing to a common global timing reference (e.g., UTC at least within a very large geographical area) and alignment of resource allocation within and out of network coverage to the global timing reference and absolute time.

Enhancement (3) can include GNSS assistance information for V2X terminals. The GNSS assistance information can be broadcasted by the eNBs in system information blocks (SIB) or in any other broadcast, groupcast, and/or unicast channels. The GNSS assistance information defined in LTE positioning protocol (LPP) protocols can be reused (at least partial content of 3GPP Assistance) to facilitate synchronization and location services for V2X applications. An example set of data is shown below:

```
GNSS-CommonAssistData ::= SEQUENCE {
   GNSS-ReferenceTime
   GNSS-ReferenceLocation
   GNSS-IonosphericModel
   GNSS-EarthOrientationParameters
}
```

GNSS-ReferenceTime can be used with GNSS specific system time with uncertainty and the relationship between GNSS system time and network air-interface timing of the eNodeB/NodeB/BTS transmission in the reference cell. An example set of data is shown below:

```
GNSS-ReferenceTime ::= SEQUENCE {
   GNSS-SystemTime,
   GNSS-ReferenceTimeForOneCell
}
GNSS-SystemTime ::= SEQUENCE {
   gnss-TimeID                 GNSS-ID,
   gnss-DayNumber              INTEGER (0..32767),
   gnss-TimeOfDay              INTEGER (0..86399),
   gnss-TimeOfDayFrac-msec     INTEGER (0..999)
   notificationOfLeapSecond    BIT STRING (SIZE(2))
   gps-TOW-Assist              GPS-TOW-Assist ...
}
```

-continued

```
GNSS-ReferenceTimeForOneCell ::= SEQUENCE {
    networkTime              NetworkTime,
    referenceTimeUnc         INTEGER (0..127),
    bsAlign                  ENUMERATED {true}
        OPTIONAL,
    ...
}
```

GNSS-ReferenceLocation can be used to provide the target device with a priori knowledge of its location in order to improve GNSS receiver performance.

Other generic information elements may be provided by eNB to improve GNSS performance as captured in GNSS-GenericAssistDataElement and corresponding subfields. An example set of data is shown below:

```
GNSS-GenericAssistDataElement ::= SEQUENCE {
    GNSS-ID,
    SBAS-ID                         Cond GNSS-ID-SBAS
    GNSS-TimeModelList
    GNSS-DifferentialCorrections
    GNSS-NavigationModel
    GNSS-RealTimeIntegrity
    GNSS-DataBitAssistance
    GNSS-AcquisitionAssistance
    GNSS-Almanac
    GNSS-UTC-Model
    GNSS-AuxiliaryInformation
}
```

Potential challenges associated with usage of GNSS technologies to improve synchronization procedure for LTE based V2X services can be resolved or reduced, including power consumption and blockage of GNSS signals. For example, the use of GNSS capable receivers can result in significant power consumption. However, the power consumption might not be an important design factor for terminals integrated to a vehicle and, in some embodiments, if GNSS is used for the purpose of synchronization, the power consumption may be reduced. In another example, when blockage of a GNSS signal occurs, the synchronization reference can be provided by the network or UEs having stable GNSS synchronization reference.

An integration of GNSS based synchronization option can increase the amount of available synchronization references. In one embodiment, both eNBs and UEs can provide synchronization reference to the UEs. Predefined rules are defined for selection of synchronization reference by a device-to-device (D2D) transmitter. In the embodiment, an eNB has higher priority as a synchronization reference, followed by a UE propagating timing from eNB. The UE serving as an autonomous synchronization reference has lower priority comparing to UEs (synchronization sources) propagating network timing and eNB.

An integration of GNSS based technology can introduce additional types of synchronization sources, including (1) GNSS based synchronization, (2) network based synchronization and (3) UE based synchronization. In GNSS based synchronization, the GNSS technology itself can serve as a global timing reference for synchronization in phase, frequency and/or time. In one embodiment, the eNB can provide a complementary synchronization source and perform control functions by associating V2X spectrum resources with global timing reference relative and network transmission time. For example, a system frame number (SFN) can be mapped to UTC time with the finer time offset (e.g., an offset less than 1 ms) being separately indicated.

In network based synchronization, eNBs are synchronized with GNSS in frequency, phase and/or time ($eNB_{GNSS}$). In one embodiment, an eNB can serve as a synchronization source for in-coverage scenarios. In this embodiment, a timing relation between eNB transmission timing and global V2X system time can be indicated to a UE in the particular geographical area. When the eNBs are not synchronized with GNSS, the eNBs might not use GNSS synchronization but can provide a stable timing reference. In asynchronous networks, the eNBs transmission timing might not be synchronized in phase and time, can be sufficiently accurate in terms of frequency synchronization.

In UE based synchronization, UEs can derive and/or propagate synchronization timing from eNBs ($UE_{SS-eNB}$). These propagating UEs can propagate network timing references in case of partial coverage scenarios to enable receiving UEs (such as vehicle terminals) to have proper synchronization when the receiving UEs approach the network from out of coverage. The UEs can also derive and propagate synchronization from GNSS ($UE_{SS-GNSS}$). A UE equipped with GNSS can have better synchronization accuracy in time and frequency, which can enable the UE to serve as a good synchronization reference. In an embodiment where GNSS timing is used for V2X system and/or services, this UE can propagate timing information towards other V2X users without available GNSS sync (e.g., due to damage of GNSS module, blocked GNSS signals (e.g., in tunnel), etc.)

A UE can serve as an independent synchronization source ($UE_{SS}$). An independent synchronization source (i.e., that does not derive its timing from any other synchronization reference sources except its own local oscillator) can establish a synchronous operation in out of coverage scenarios. In some embodiments using V2X services, benefits of using such sources might be limited, resulting in a lowest priority or lower priority when compared with other synchronization references in LTE.

Figure 2:
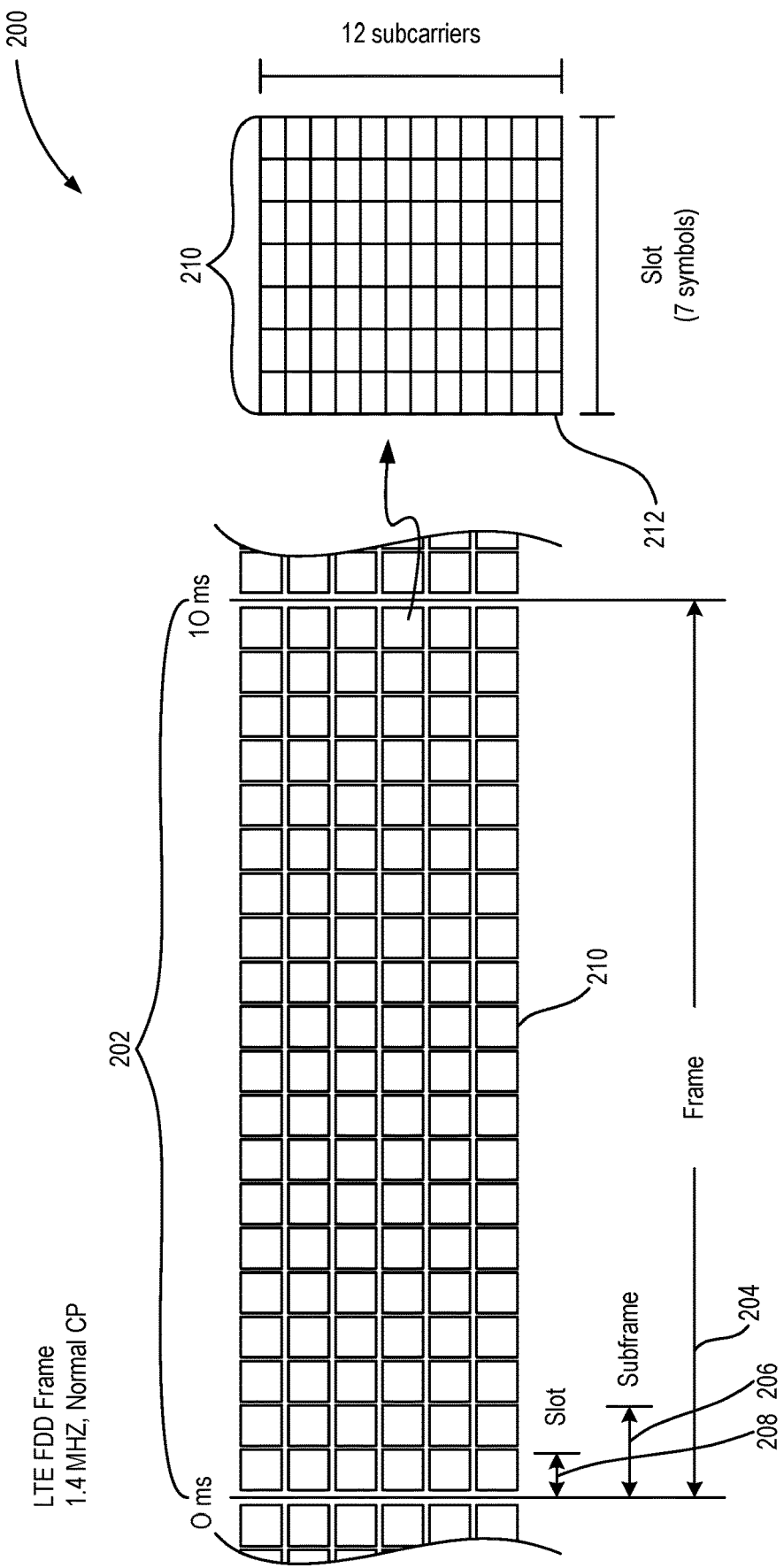
FIG. 2 is a diagram illustrating a long term evolution (LTE) communication frame consistent with embodiments disclosed herein.

FIG. 2 is a schematic diagram 200 illustrating long term evolution (LTE) communication frame 204 of 10 ms duration 202. In one embodiment, each frequency allocation (carrier) can be in 180 kHz increments. In the diagram shown, a minimum of six carriers are shown. This allows for a bandwidth of 1.08 MHz (six carriers times 180 kHz=1.08 MHz bandwidth). In some embodiments, the carriers can be expanded to 110 blocks (110 carriers times 180 kHz=19.8 MHz). Frame 204 can be 10 ms with each slot 208 being 0.5 ms (and each subframe 206 being 1 ms).

Slot 208 at a carrier is resource block 210, which includes seven symbols at 12 orthogonal frequency-division multiplexing (OFDM) subcarriers. Resource element 212 is one OFDM subcarrier for the duration of one OFDM symbol. Resource block 210 can include 84 resource elements 212 when using a normal cyclic prefix (CP). OFDM spacing between individual subcarriers in LTE can be 15 kHz. A guard period of a CP can be used in the time domain to help prevent multipath inter-symbol interference (ISI) between subcarriers. The CP can be a guard period before each OFDM symbol in each subcarrier to prevent ISI (such as due to multipath).

Figure 3:
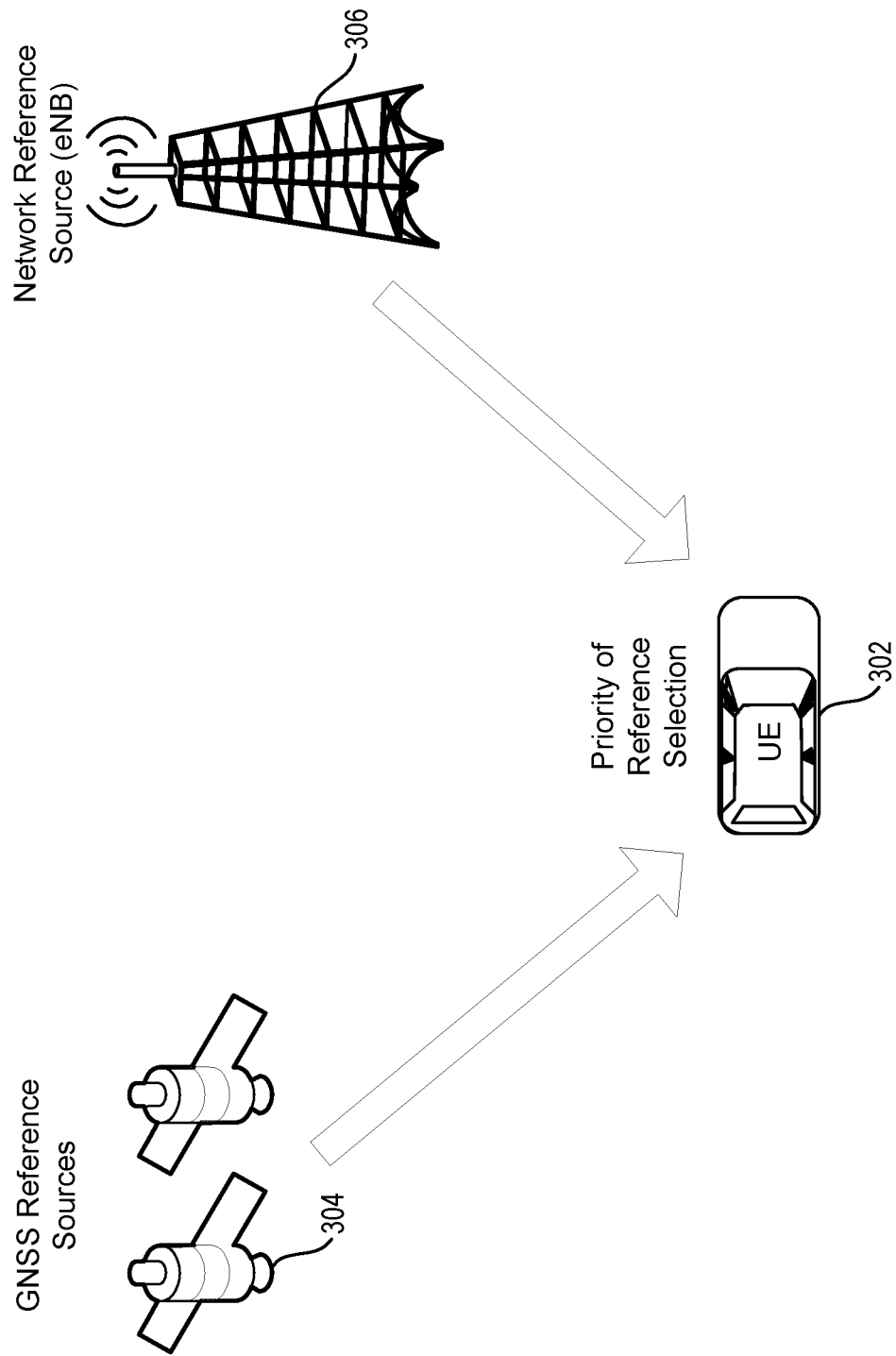
FIG. 3 is a diagram illustrating multiple timing references provided to a user equipment (UE) consistent with embodiments disclosed herein.

FIG. 3 is a diagram illustrating multiple timing references provided to a user equipment (UE) consistent with embodiments disclosed herein. A UE 302 receives synchronization timing references from GNSS reference sources 304 and network reference source 306. With both synchronization timing references available, the UE can determine and/or select a synchronization timing reference based on a determined priority. The determined priority can be pre-determined, provided by the network and/or dynamically determined.

In some embodiments, with an increased number of possible synchronization reference types, priority rules for synchronization source selection can be pre-defined (e.g., default priority rules including parameters defining timing relations and their association with spectrum resource allocation). Alternatively, these rules can be provided/configured by the network, if available, for each V2X system carrier.

For instance, the following general rules can be configured:

GNSS>eNB>UE$_{\{GNSS,\ eNB\}}$. This rule indicates that a GNSS synchronization source has a highest priority as a synchronization reference. The next priority is an eNB, and then a UE (deriving timing from an eNB or a GNSS).

eNB>GNSS>UE$_{\{GNSS,\ eNB\}}$. UE$_{ISS}$. This rule indicates that the network reference (e.g., an eNB) has a highest priority than synchronization reference, followed by GNSS which is followed by a UE (deriving timing from eNB or GNSS), which is followed by a UE acting as an independent synchronization source (ISS).

eNB>UE$_{\{GNSS,\ eNB\}}$>GNSS>EU$_{ISS}$. This rule indicates that the network reference (e.g., an eNB) has a highest priority as a synchronization reference followed by a UE (deriving timing from eNB or GNSS), which is followed by GNSS, which is followed by a UE acting as an independent synchronization source (ISS).

GNSS>UE$_{\{GNSS,\ eNB\}}$>eNB>UE$_{ISS}$. This rule indicates that a GNSS synchronization source has higher priority as a synchronization reference followed by a UE (deriving timing from GNSS), which is followed by an eNB, which is followed by a UE acting as an independent synchronization source (ISS).

Other combinations of priority rules for synchronization source selection can be defined. In some embodiments, an eNB and a GNSS can be jointly used for synchronization. These rules can be predefined by specification or configured by network.

Figure 4:
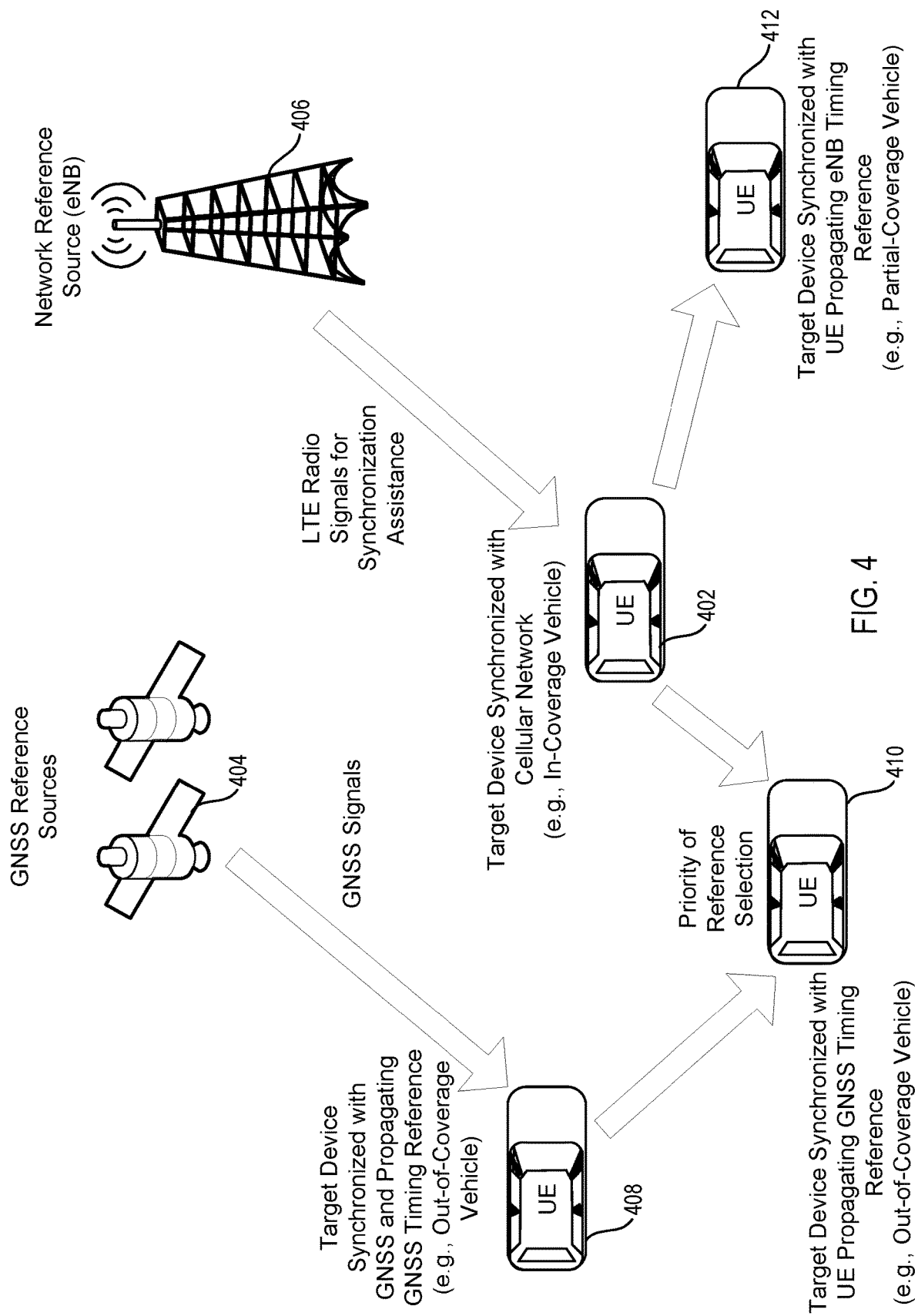
FIG. 4 is a diagram illustrating propagation of timing references consistent with embodiments disclosed herein.

FIG. 4 is a diagram illustrating propagation of timing references, which includes out-of-coverage and partial coverage scenarios. In the example shown, UE$_{eNB}$ 402 receives a synchronization reference signal from the eNB 406. UE$_{eNB}$ propagates the synchronization information to partial-coverage UE 412 and out-of-coverage UE 410. UE 412 selects the only synchronization reference available, which is the reference provided by source UE$_{eNB}$ 402. UE$_{GNSS}$ 408 receives a GNSS timing reference signal from GNSS system 404 (e.g., satellite, terrestrial antenna, etc.). UE$_{GNSS}$ is out-of-coverage, as it does not have network connectivity. UE$_{GNSS}$ selects the GNSS synchronization source as the timing reference. UE$_{GNSS}$ propagates the timing reference to UE 410. UE 410, based on priority rules, selects the timing reference provided by UE$_{GNSS}$, as having a higher priority than UE$_{eNB}$.

In out of coverage scenarios, the following priority rules for synchronization reference selection can be used:

GNSS>UE$_{GNSS}$>UE$_{ISS}$. This rule indicates that the GNSS synchronization source has a highest priority as a synchronization reference followed by a UE deriving timing from the GNSS, which is followed by a UE acting as an independent synchronization source.

In a partial coverage scenario (when an eNB is not available but synchronization source UE$_{\{eNB\}}$ is detected propagating timing from the network), the following priority rules for synchronization references or sources can be defined:

GNSS>EU$_{GNSS}$>UE$_{eNB}$>UE$_{ISS}$

GNSS>EU$_{eNB}$>UE$_{GNSS}$>UE$_{ISS}$

UE$_{eNB}$>GNSS>EU$_{GNSS}$>UE$_{ISS}$

Figure 5:
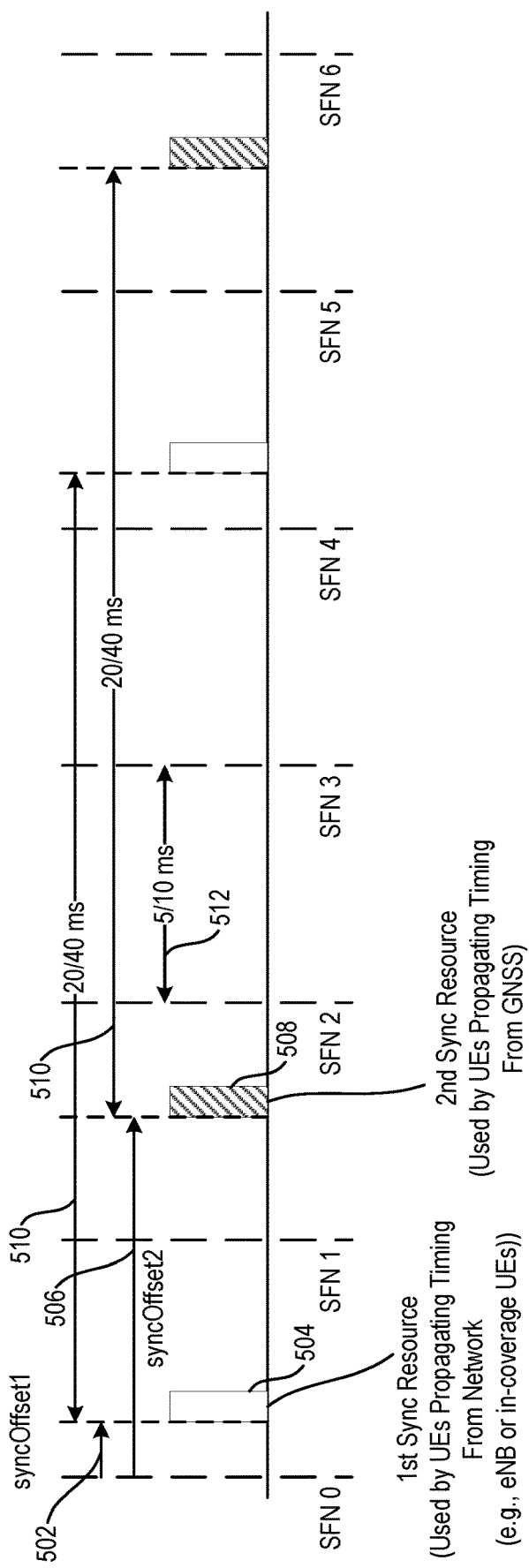
FIG. 5 is a diagram of synchronization resource timing consistent with embodiments disclosed herein.

FIG. 5 is a diagram of synchronization resource timing, including propagation of synchronization reference by different types of synchronization sources. In some embodiments, synchronization signals or physical sidelink broadcast channel (PSBCH) payloads can indicate a synchronization source (or reference). Timing information in LTE can also be made implicit based on a relative timing of the signal. For example, timing reference signals 504 with a first offset 502 from system frame number 0 (SFN0) or from a subframe boundary can be implied to be from an eNB or an in-coverage UE. Timing reference signals 508 with a second offset 506 from system frame number 0 (SFN0) or from a subframe boundary can be implied to be from a GNSS. While the signals have different placement, the timing reference signals 504, 508 can have a period 510, over which the timing information repeats. In the embodiment shown, the period 510 is longer than an LTE frame 512.

In order to propagate synchronization timing, synchronization sources can transmit using synchronization channels and signals. In one embodiment using LTE, PSBCH (physical sidelink broadcast channel), primary sidelink synchronization signals (PSSS) and/or secondary sidelink synchronization signals (SSSS) can be used. However, different synchronization sources (or references) can have different synchronization accuracy in frequency, phase and/or time. To differentiate the synchronization sources by type, dedicated synchronization resources, channels and/or signals can be allocated for each type of synchronization source. For example, distinct sidelink synchronization signal (SLSS) IDs and/or separate synchronization resources can be assigned to synchronization sources deriving timing from eNB (UE$_{eNB}$), GNSS (UE$_{GNSS}$), GNSS+eNB (UE$_{GNSS,+eNB}$) or UE$_{ISS}$.

An indication of the synchronization reference can be indicated using different methods, including carried by PSSS/SSSS signals, a PSBCH payload and/or implicit indication. When carried by PSSS/SSSS signals, different subsets of existing sequences can be allocated for different synchronization reference types. For example, an additional PSSS root index for UEs deriving timing from GNSS can be defined. In another example, new signals can be defined or a physical structure can be changed, etc.

When a PSBCH payload is used, additional reserved fields can be added to existing PSBCH content to indicate that timing is derived or propagated from a timing reference, such as GNSS. The PSBCH payload can also carry content providing information on timing relation between GNSS system time, network transmission time and/or V2X system time.

In other embodiments, an implicit indication based on the time instance of the synchronization resource relative to global time or SFN0 can be used, as shown in FIG. 5 and described above.

In some embodiments, when GNSS is used as a synchronization reference, an absolute time can be used to define a spectrum resources and time-slotted structure for transmission. The timing can be accurate within the range of less than 1 microsecond (e.g., 100 nanoseconds). This sub-microsecond accuracy provides additional benefit of using GNSS as a reference, when compared to a timing derived from eNB, which does not compensate a propagation delay (i.e. utilize DL reception timing). In some embodiments, separate synchronization resources are allocated that can be used for transmission of synchronization signals by vehicles that are synchronized in absolute time.

UEs that propagate timing from an eNB can further adjust its transmission timing in order to coarsely compensate the propagation delay from eNB based on analysis of earliest signal arrival time. For example, the UE can compare signal reception timing from an eNB or from a UE propagating timing reference from GNSS or directly with GNSS timing. Adjustments can be configured and/or enabled by an eNB.

Figure 6:
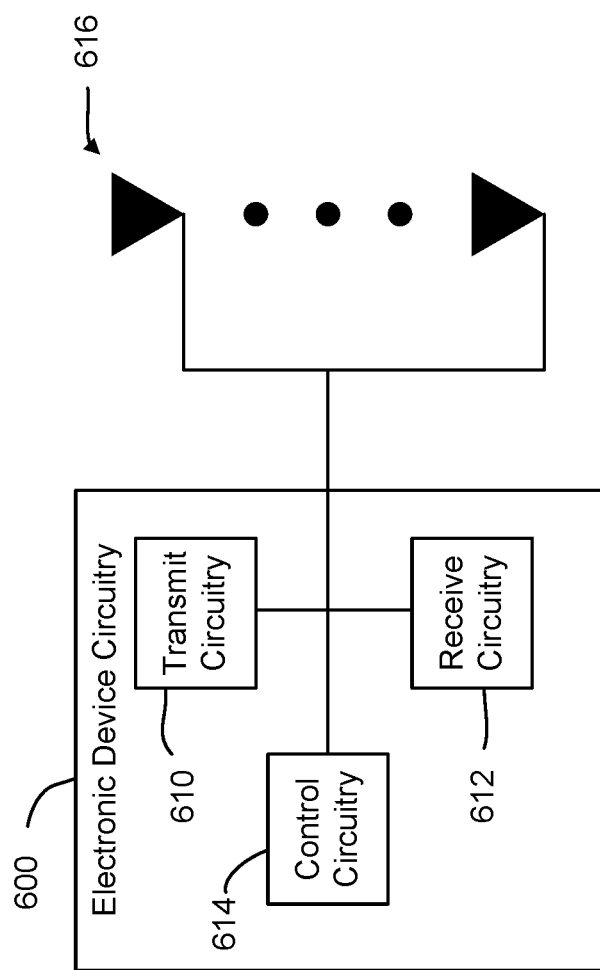
FIG. 6 is a block diagram illustrating electronic device circuitry consistent with embodiments disclosed herein.

FIG. 6 is a block diagram illustrating electronic device circuitry 600 that may be eNB circuitry, UE circuitry, network node circuitry, or some other type of circuitry in accordance with various embodiments. In embodiments, the electronic device circuitry 600 may be, or may be incorporated into or otherwise a part of, an eNB, a UE, a mobile station (MS), a BTS, a network node, or some other type of electronic device. In embodiments, the electronic device circuitry 600 may include radio transmit circuitry 610 and receive circuitry 612 coupled to control circuitry 614. In embodiments, the transmit circuitry 610 and/or receive circuitry 612 may be elements or modules of transceiver circuitry, as shown. The electronic device circuitry 610 may be coupled with one or more plurality of antenna elements 616 of one or more antennas. The electronic device circuitry 600 and/or the components of the electronic device circuitry 600 may be configured to perform operations similar to those described elsewhere in this disclosure.

In embodiments where the electronic device circuitry 600 is or is incorporated into or otherwise part of a UE, the transmit circuitry 610 can transmit timing references as shown in FIG. 1. The receive circuitry 612 can receive timing references as shown in FIG. 1.

In embodiments where the electronic device circuitry 600 is an eNB, BTS and/or a network node, or is incorporated into or is otherwise part of an eNB, BTS and/or a network node, the transmit circuitry 610 can transmit timing references as shown in FIG. 1. The receive circuitry 612 can receive transmissions from the UE or timing references from the GNSS as shown in FIG. 1.

Figure 8:
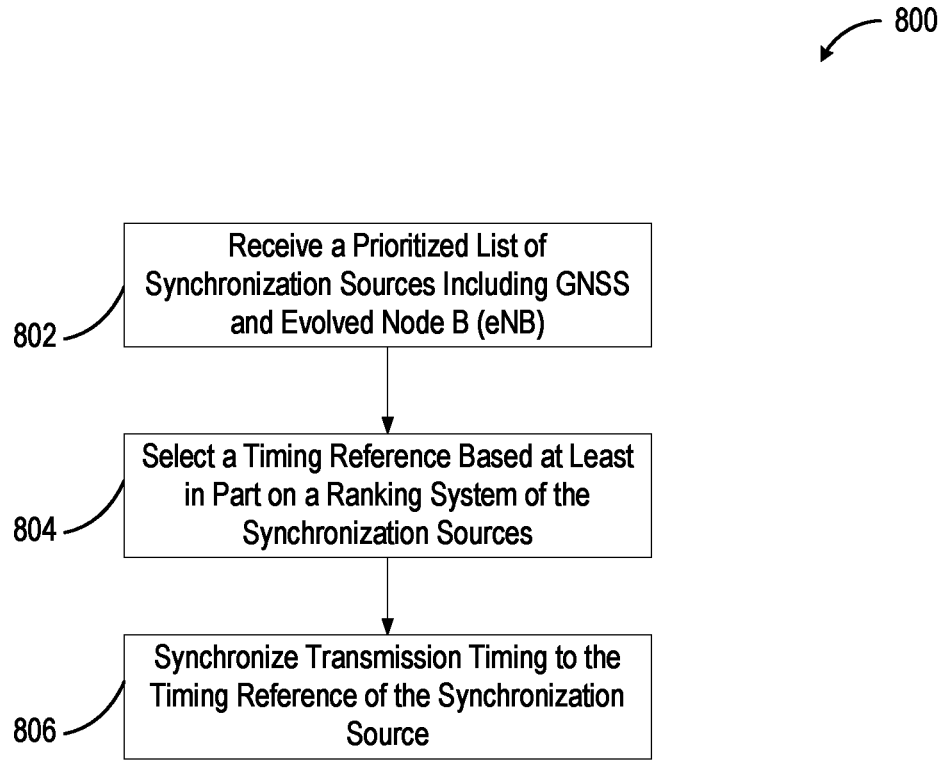
FIG. 8 is a flow chart illustrating a method for prioritizing an LTE timing reference consistent with embodiments disclosed herein.

In certain embodiments, the electronic device circuitry 600 shown in FIG. 6 is operable to perform one or more methods, such as the methods shown in FIG. 8.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
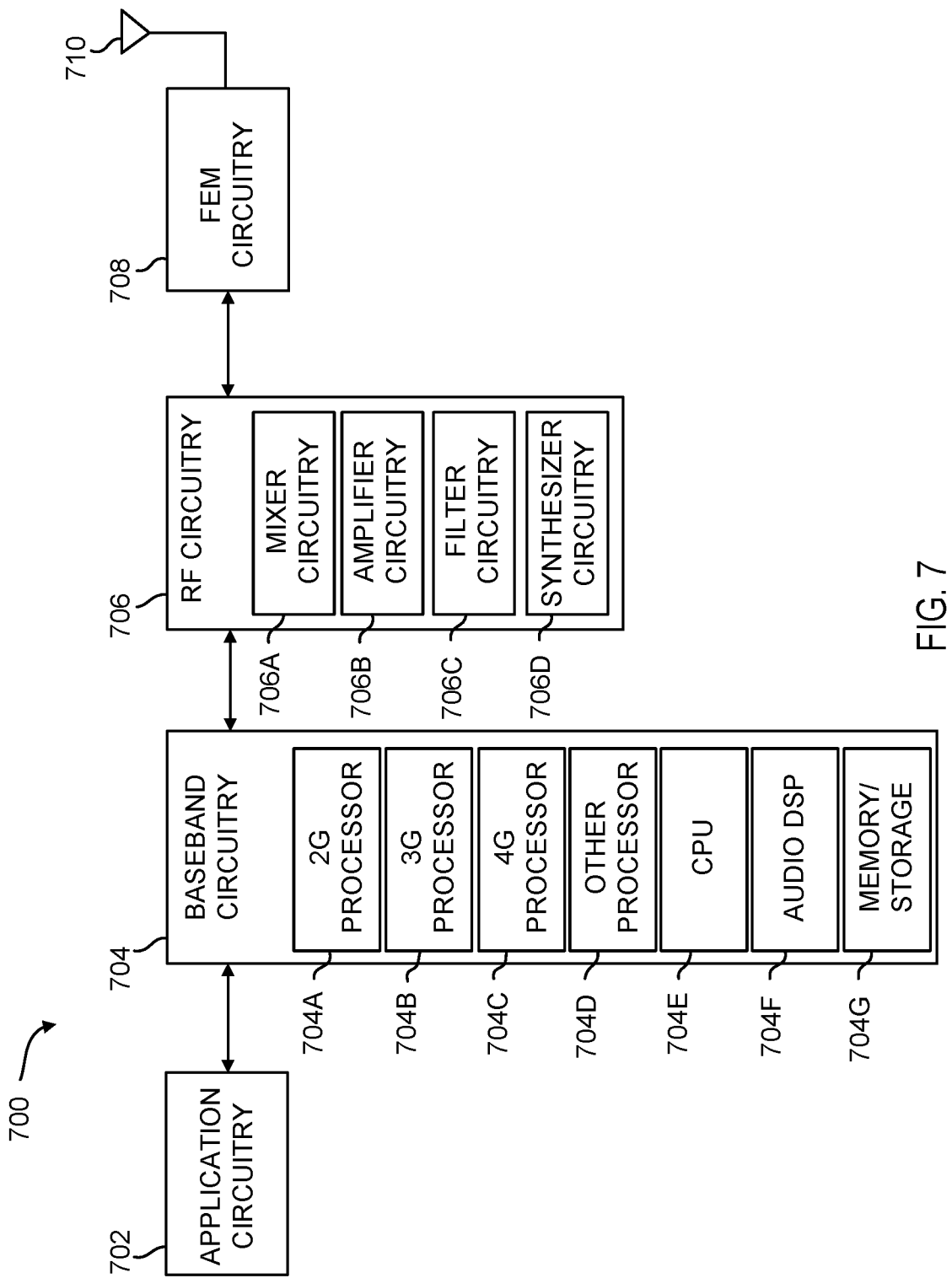
FIG. 7 is a diagram of a UE consistent with embodiments disclosed herein.

Embodiments described herein may be implemented into a system using any suitably configured hardware and/or software. FIG. 7 is a block diagram illustrating, for one embodiment, example components of a user equipment (UE) or mobile station (MS) device 700. In some embodiments, the UE device 700 may include application circuitry 702, baseband circuitry 704, Radio Frequency (RF) circuitry 706, front-end module (FEM) circuitry 708, and one or more antennas 710, coupled together at least as shown in FIG. 7.

The application circuitry 702 may include one or more application processors. By way of non-limiting example, the application circuitry 702 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 704 may include one or more single-core or multi-core processors. The baseband circuitry 704 may include one or more baseband processors and/or control logic. The baseband circuitry 704 may be configured to process baseband signals received from a receive signal path of the RF circuitry 706. The baseband 704 may also be configured to generate baseband signals for a transmit signal path of the RF circuitry 706. The baseband processing circuitry 704 may interface with the application circuitry 702 for generation and processing of the baseband signals, and for controlling operations of the RF circuitry 706.

By way of non-limiting example, the baseband circuitry 704 may include at least one of a second generation (2G) baseband processor 704A, a third generation (3G) baseband processor 704B, a fourth generation (4G) baseband processor 704C, other baseband processor(s) 704D for other existing generations, and generations in development or to be developed in the future (e.g., fifth generation (5G), 6G, etc.). The baseband circuitry 704 (e.g., at least one of baseband processors 704A-704D) may handle various radio control functions that enable communication with one or more radio networks via the RF circuitry 706. By way of non-limiting example, the radio control functions may include signal modulation/demodulation, encoding/decoding, radio frequency shifting, other functions, and combinations thereof. In some embodiments, modulation/demodulation circuitry of the baseband circuitry 704 may be programmed to perform Fast-Fourier Transform (FFT), precoding, constellation mapping/demapping functions, other functions, and combinations thereof. In some embodiments, encoding/decoding circuitry of the baseband circuitry 704 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 704 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704E of the baseband circuitry 704 may be programmed to run elements of the protocol stack for signaling of the PHY, MAC, RLC, PDCP and/or RRC layers. In some embodiments, the baseband circuitry 704 may include one or more audio digital signal processor(s) (DSP) 704F. The audio DSP(s) 704F may include elements for compression/decompression and echo cancellation. The audio DSP(s) 704F may also include other suitable processing elements.

The baseband circuitry 704 may further include memory/storage 704G. The memory/storage 704G may include data and/or instructions for operations performed by the processors of the baseband circuitry 704 stored thereon. In some embodiments, the memory/storage 704G may include any combination of suitable volatile memory and/or non-volatile memory. The memory/storage 704G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 704G may be shared among the various processors or dedicated to particular processors.

Components of the baseband circuitry 704 may be suitably combined in a single chip, a single chipset, or disposed on a same circuit board in some embodiments. In some embodiments, some or all of the constituent components of the baseband circuitry 704 and the application circuitry 702 may be implemented together, such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN) and/or a wireless personal area network (WPAN). Embodiments in which the baseband circuitry 704 is configured to support radio communications of more than one wireless protocol may be referred to as multi-mode baseband circuitry.

The RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. The RF circuitry 706 may include a receive signal path which may include circuitry to down-convert RF signals received from the FEM circuitry 708, and provide baseband signals to the baseband circuitry 704. The RF circuitry 706 may also include a transmit signal path which may include circuitry to up-convert baseband signals provided by the baseband circuitry 704, and provide RF output signals to the FEM circuitry 708 for transmission.

In some embodiments, the RF circuitry 706 may include a receive signal path and a transmit signal path. The receive signal path of the RF circuitry 706 may include mixer circuitry 706A, amplifier circuitry 706B, and filter circuitry 706C. The transmit signal path of the RF circuitry 706 may include filter circuitry 706C and mixer circuitry 706A. The RF circuitry 706 may further include synthesizer circuitry 706D configured to synthesize a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals.

The filter circuitry 706C may include a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may include zero-frequency baseband signals, although this is not a requirement. In some embodiments, the mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by filter circuitry 706C. The filter circuitry 706C may include a low-pass filter (LPF), although the scope of the embodiments is not limited in this respect. In some embodiments, the mixer circuitry 706A of the receive signal path and the mixer circuitry 706A of the transmit signal path may include two or more mixers, and may be arranged for quadrature downconversion and/or upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and/or direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 706 may include analog-to-digital converter (ADC) and digital-to-analog converter (DAC) circuitry, and the baseband circuitry 704 may include a digital baseband interface to communicate with the RF circuitry 706.

In some dual-mode embodiments, separate radio IC circuitry may be provided for processing signals for each spectrum, although the scope of the embodiments is not limited in this respect.

In some embodiments, the synthesizer circuitry 706D may include one or more of a fractional-N synthesizer and a fractional N/N+1 synthesizer, although the scope of the embodiments is not limited in this respect as other types of frequency synthesizers may be suitable. For example, synthesizer circuitry 706D may include a delta-sigma synthesizer, a frequency multiplier, a synthesizer comprising a phase-locked loop with a frequency divider, other synthesizers and combinations thereof.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

The synthesizer circuitry 706D of the RF circuitry 706 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 706D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

The FEM circuitry 708 may include a receive signal path which may include circuitry configured to operate on RF signals received from one or more antennas 710, amplify the received signals, and provide the amplified versions of the received signals to the RF circuitry 706 for further processing. The FEM circuitry 708 may also include a transmit signal path which may include circuitry configured to amplify signals for transmission provided by the RF circuitry 706 for transmission by at least one of the one or more antennas 710.

In some embodiments, the FEM circuitry 708 may include a TX/RX switch configured to switch between a transmit mode and a receive mode operation. The FEM circuitry 708 may include a receive signal path and a transmit signal path. The receive signal path of the FEM circuitry 708 may include a low-noise amplifier (LNA) to amplify received RF signals and provide the amplified received RF signals as an output (e.g., to the RF circuitry 706). The transmit signal path of the FEM circuitry 708 may include a power amplifier (PA) configured to amplify input RF signals (e.g., provided by RF circuitry 706), and one or more filters configured to generate RF signals for subsequent transmission (e.g., by one or more of the one or more antennas 710.

In some embodiments, the MS device 700 may include additional elements such as, for example, memory/storage, a display, a camera, one of more sensors, an input/output (I/O) interface, other elements, and combinations thereof.

In some embodiments, the MS device 700 may be configured to perform one or more processes, techniques, and/or methods as described herein, or portions thereof.

FIG. 8 shows a method 800 for using a prioritized timing reference in LTE. The method can be accomplished using various systems, including the systems shown in FIGS. 1 and 9. In block 802, a UE receives a prioritized list of synchronization sources including GNSS and evolved Node B (eNB). In block 804, the UE selects a timing reference based at least in part on a ranking system of the synchronization sources. In block 806, the UE synchronizes transmission timing to the timing reference of the synchronization source.

Figure 9:
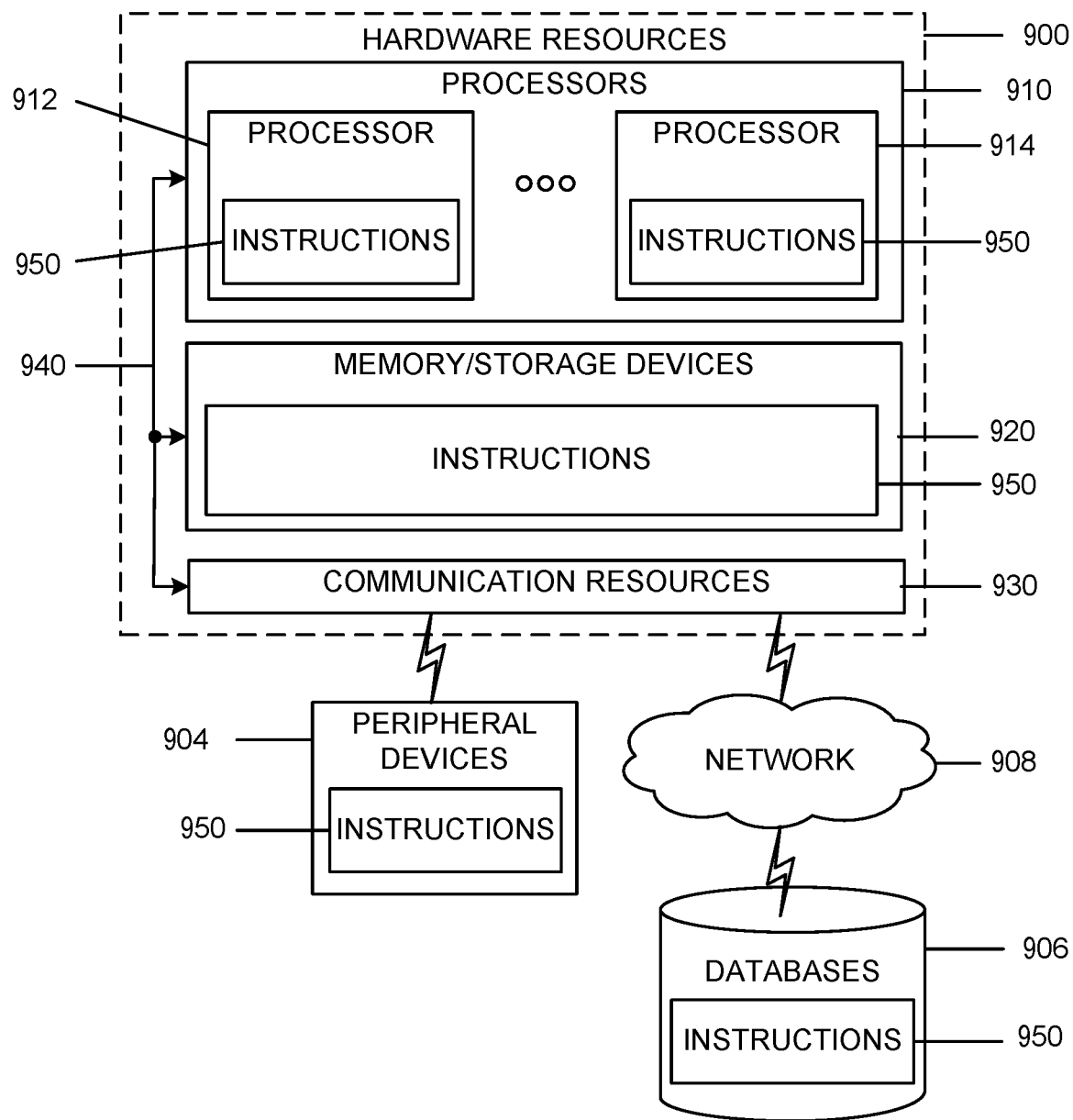
FIG. 9 is a diagram illustrating a computing system consistent with embodiments disclosed herein.

FIG. 9 is a block diagram illustrating components, according to some example embodiments, able to read instructions from a machine-readable or computer-readable medium (e.g., a machine-readable storage medium) and perform any one or more of the methodologies discussed herein. Specifically, FIG. 9 shows a diagrammatic representation of hardware resources 900 including one or more processors (or processor cores) 910, one or more memory/storage devices 920, and one or more communication resources 930, each of which are communicatively coupled via a bus 940.

The processors 910 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 912 and a processor 914. The memory/storage devices 920 may include main memory, disk storage, or any suitable combination thereof.

The communication resources 930 may include interconnection and/or network interface components or other suitable devices to communicate with one or more peripheral devices 904 and/or one or more databases 906 via a network 908. For example, the communication resources 930 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 950 may comprise software, a program, an application, an applet, an app, or other executable code for causing at least any of the processors 910 to perform any one or more of the methodologies discussed herein. The instructions 950 may reside, completely or partially, within at least one of the processors 910 (e.g., within the processor's cache memory), the memory/storage devices 920, or any suitable combination thereof. Furthermore, any portion of the instructions 950 may be transferred to the hardware resources 900 from any combination of the peripheral devices 904 and/or the databases 906. Accordingly, the memory of processors 910, the memory/storage devices 920, the peripheral devices 904, and the databases 906 are examples of computer-readable and machine-readable media.

EXAMPLES

Example 1 is a system for wireless transmissions using a prioritized timing reference. The system includes a global navigation satellite system (GNSS) receiver; a wireless transceiver configured to communicate with a first device; and a processor. The processor is designed to receive a prioritized list of synchronization sources including GNSS and enhanced Node B (eNB); select a timing reference based at least in part on a ranking system of the synchronization sources; and synchronize transmission timing to the timing reference of the synchronization source.

In Example 2, the subject matter of Example 1 or any of the Examples described herein may further include a prioritized list of synchronization sources to receive the prioritized list from an eNB.

In Example 3, the subject matter of Example 1 or any of the Examples described herein may further include a prioritized list of synchronization sources containing a user equipment In Example 4, the subject matter of Example 1 or any of the Examples described herein may further include selecting a lower priority synchronization source over a higher priority synchronization source, based in part on availability, when selecting the timing reference.

In Example 5, the subject matter of Example 1 or any of the Examples described herein may further include propagating the timing information for devices without GNSS synchronization.

In Example 6, the subject matter of Example 1 or any of the Examples described herein may further include an in-coverage device using GNSS based on an enhanced Node B (eNB) priority message.

In Example 7, the subject matter of Example 1 or any of the Examples described herein may further include a transmission timing which includes transmissions that are frame mapped to coordinated universal time (UTC).

In Example 8, the subject matter of Example 7 or any of the Examples described herein may further include a transmission timing which includes a separate offset indicator for timing below one millisecond.

In Example 9, the subject matter of Example 1 or any of the Examples described herein may further include a prioritized list of synchronization sources which includes data indicating a level of synchronization in frequency, phase, or time.

In Example 10, the subject matter of Example 1 or any of the Examples described herein may further include a prioritized list of synchronization sources which includes data indicating the signaling of the timing offset in a granularity of less that cyclic prefix duration relative to global coordinated universal time (UTC).

In Example 11, the subject matter of Example 1 or any of the Examples described herein may further include the timing reference between a network system timing, a GNSS system timing, and proximity services (ProSe) system timing which are related to a common global timing reference.

In Example 12, the subject matter of Example 11 or any of the Examples described herein may further include an alignment of resource allocations within and out of network coverage that are aligned to the global timing reference.

In Example 13, the subject matter of Example 1 or any of the Examples described herein may further include a processor designed to receive the GNSS assistance information broadcasted by the eNB in system information blocks.

In Example 14, the subject matter of Example 1 or any of the Examples described herein may further include the GNSS assistance information in long term evolution positioning protocol (LPP) to be reused.

In Example 15, the subject matter of Example 14 or any of the Examples described herein may further include the GNSS-ReferenceTime data element reused for a relationship between GNSS system time and network air-interface timing of the eNB transmission in a reference cell.

In Example 16, the subject matter of Example 14 or any of the Examples described herein may further include the GNSS-ReferenceLocation data element reused to provide knowledge of a location to improve GNSS receiver performance.

In Example 17, the subject matter of Example 14 or any of the Examples described herein may further include the GNSS-GenericAssistDataElement data element reused to improve GNSS performance.

In Example 18, the subject matter of Example 1 or any of the Examples described herein may further include the processor designed to receive propagation of synchronization information based on a type of the synchronization source, based on transmission of the synchronization signal or synchronization channel.

In Example 19, the subject matter of Example 1 or any of the Examples described herein may further include the processor designed to receive a synchronization signal or synchronization channel which carries information about a type of the synchronization source.

In Example 20, the subject matter of Example 1 or any of the Examples described herein may further include the processor designed to receive a dedicated synchronization resource which is allocated to propagate synchronization based on type of synchronization source.

In Example 21, the subject matter of Example 1 or any of the Examples described herein may further include a timing reference which includes selecting a combination of synchronization sources.

In Example 22, the subject matter of Example 21 or any of the Examples described herein may further include the combination of synchronization sources selected from GNSS, eNB or user equipment (UE).

In Example 23, the subject matter of Example 1 or any of the Examples described herein may further include eNB and GNSS timing aligned and associated with common resource allocation, unambiguously defining a physical structure of resource pool configuration for data and control, once a UE acquires timing information.

Example 24 is an apparatus of a user equipment (UE). The apparatus includes a global navigation satellite system (GNSS) interface, a wireless cellular interface, and a processor. The GNSS interface is attached to a GNSS receiver. The wireless cellular interface is designed to communicate with a peer UE. The processor is attached to the GNSS interface and wireless cellular interface, and is designed to determine available synchronization sources, select a GNSS synchronization source based in part on a priority rule, and transmit an indication of the GNSS synchronization source to the peer UE.

In Example 25, the subject matter of Example 24 or any of the Examples described herein may further include the GNSS synchronization source transmitted via a primary sidelink synchronization signal (PSSS).

In Example 26, the subject matter of Example 24 or any of the Examples described herein may further include the GNSS synchronization source transmitted via a secondary sidelink synchronization signal (SSSS).

In Example 27, the subject matter of Example 24 or any of the Examples described herein may further include the GNSS synchronization source transmitted via a physical sidelink broadcast channel PSBCH payload.

In Example 28, the subject matter of Example 24 or any of the Examples described herein may further include the GNSS synchronization source to be determined by an implicit indication.

Example 29 is an apparatus of an enhanced node B (eNB). The apparatus includes a processor designed to transmit assistance information indicating a GNSS synchronization source, and establish phase, frequency, or time synchronization with the device.

In Example 30, the subject matter of Example 29 or any of the Examples described herein may further include the apparatus containing a global navigation satellite system (GNSS) receiver, and a wireless transceiver designed to communicate with the device.

In Example 31, the subject matter of Example 29 or any of the Examples described herein may further include the processor designed to enable the apparatus to act as a synchronization source for the device in an in-coverage scenario.

In Example 32, the subject matter of Example 29 or any of the Examples described herein may further include the processor designed to enable the apparatus to act as a synchronization source for the device that lacks a GNSS receiver.

In Example 33, the subject matter of Example 29 or any of the Examples described herein may further include the processor designed to communicate with the device without acting as a synchronization source for the device in an in-coverage scenario.

Example 34 is a computer program product. The computer program product includes a computer-readable storage medium storing program code. The computer-readable storage medium storing program code causes one or more processors to perform a method. The method includes determining available synchronization sources; selecting, based in part on a priority rule, a synchronization source from a set of synchronization sources for proximity services communication with a first user equipment (UE); communicating assistance information containing the selected synchronization source to the UE; establishing a common timing based on the selected synchronization source reference; and propagating the common timing to a second UE for which the selected synchronization source is unavailable.

In Example 35, the subject matter of Example 34 or any of the Examples described herein may further include global navigation satellite system (GNSS) and enhanced node B (eNB) synchronization in the synchronization sources.

In Example 36, the subject matter of Example 34 or any of the Examples described herein may further include the synchronization sources containing a combination of a global navigation satellite system (GNSS) and enhanced node B (eNB) synchronization.

In Example 37, the subject matter of Example 34 or any of the Examples described herein may further include communicating the assistance information by transmitting the assistance information over a sidelink channel.

In Example 38, the subject matter of Example 34 or any of the Examples described herein may further include the priority rule based on whether the first UE is in-coverage.

In Example 39, the subject matter of Example 38 or any of the Examples described herein may further include the priority rule to be GNSS before an eNB signal before a UE signal.

In Example 40, the subject matter of Example 38 or any of the Examples described herein may further include the priority rule to be an enhanced node B (eNB) signal before GNSS before a UE signal.

In Example 41, the subject matter of Example 34 or any of the Examples described herein may further include the priority rule based on whether the first UE is out of coverage.

In Example 42, the subject matter of Example 41 or any of the Examples described herein may further include priority rule based on GNSS before a UE signal based on GNSS before a UE signal based on internal synchronization signal.

In Example 43, the subject matter of Example 41 or any of the Examples described herein may further include the priority rule containing a UE signal based on eNB synchronization before a UE signal based on GNSS synchronization before a UE signal based on internal synchronization signal.

Example 44 is an apparatus for synchronization in long term evolution (LTE). The apparatus includes a method for determining available synchronization sources; a method for selecting, based in part on a priority rule, a synchronization source from a set of synchronization sources for proximity services communication with a first user equipment (UE); a method for communicating assistance information comprising the selected synchronization source to the UE; a method for establishing a common timing based on the selected synchronization source reference; and a method for propagating the common timing to a second UE for which the selected synchronization source is unavailable.

In Example 45, the subject matter of Example 44 or any of the Examples described herein may further include the synchronization sources containing global navigation satellite system (GNSS) and enhanced node B (eNB) synchronization.

In Example 46, the subject matter of Example 44 or any of the Examples described herein may further include the synchronization sources containing a combination of a global navigation satellite system (GNSS) and enhanced node B (eNB) synchronization.

In Example 47, the subject matter of Example 44 or any of the Examples described herein may further include a method for communicating the assistance information and for transmitting the assistance information over a sidelink channel.

Example 48 is a method of synchronization in long term evolution (LTE). The LTE includes determining available synchronization sources; selecting, based in part on a priority rule, a synchronization source from a set of synchronization sources for proximity services communication with a first user equipment (UE); communicating assistance information containing the selected synchronization source to the UE; establishing a common timing based on the selected synchronization source reference; and propagating the common timing to a second UE for which the selected synchronization source is unavailable.

In Example 49, the subject matter of Example 48 or any of the Examples described herein may further include the synchronization sources with global navigation satellite system (GNSS) and enhanced node B (eNB) synchronization.

In Example 50, the subject matter of Example 48 or any of the Examples described herein may further include the synchronization sources with a combination of a global navigation satellite system (GNSS) and enhanced node B (eNB) synchronization.

Example 51 is a method for wireless transmissions using a prioritized timing reference. The method includes receiving a prioritized list of synchronization sources including a GNSS and an enhanced Node B (eNB); selecting a timing reference based in part on a ranking system of the synchronization sources; and synchronizing transmission timing to the timing reference of the synchronization source.

In Example 52, the subject matter of Example 51 or any of the Examples described herein may further include receiving a prioritized list of synchronization sources and a prioritized list from an eNB.

In Example 53, the subject matter of Example 51 or any of the Examples described herein may further include a prioritized list of synchronization sources containing a UE.

In Example 54, the subject matter of Example 51 or any of the Examples described herein may further include a timing reference containing selecting a lower priority synchronization source over a higher priority synchronization source based in part on availability.

Example 55 is a method for wireless transmissions using a prioritized timing reference. The method includes transmitting assistance information indicating a GNSS synchronization source; and establishing phase, frequency, or time synchronization information for delivery to a device in communication with an eNB.

In Example 56, the subject matter of Example 55 or any of the Examples described herein may further include acting as a synchronization source for the device in an in-coverage scenario.

In Example 57, the subject matter of Example 55 or any of the Examples described herein may further include acting as a synchronization source for the device that lacks a GNSS receiver.

In Example 58, the subject matter of Example 55 or any of the Examples described herein may further include communicating with the device without acting as a synchronization source for the device in an in-coverage scenario.

Example 59 is an apparatus containing a procedure to perform a method as identified in any of Examples 48-58.

Example 60 is a machine-readable storage including machine-readable instructions, which, when executed, implement a method or realize an apparatus as identified in any of Examples 48-58.

Example 61 is a machine-readable medium including code, which, when executed, causes a machine to perform the method of any one of Examples 48-58.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment of the present embodiments. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of embodiments presented. One skilled in the relevant art will recognize, however, that the various embodiments may be practiced without one or more of the specific details, or with other methods, components, materials, etc. In other instances, well-known structures, materials, or operations are not shown or described in detail to avoid obscuring aspects of the various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/aspects/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles. The scope of the present disclosure should, therefore, be determined only by the following claims.

The invention claimed is:

1. A system for wireless transmissions using a prioritized timing reference comprising:
   a global navigation satellite system (GNSS) receiver;
   a wireless transceiver configured to communicate with a first device;
   a processor configured to:
      receive a prioritized list of synchronization sources including GNSS and evolved Node B (eNB);
      select a timing reference based at least in part on a ranking system of the synchronization sources; and
      synchronize transmission timing to the timing reference of the synchronization source.

2. The system of claim 1, wherein to receive a prioritized list of synchronization sources further comprises to receive the prioritized list from an eNB.

3. The system of claim 1, wherein to receive a prioritized list of synchronization sources further comprises to use a pre-defined list of synchronization sources.

4. The system of claim 1, wherein the processor is further configured to propagate timing information for devices without GNSS synchronization.

5. The system of claim 1, wherein an in-coverage device uses GNSS based on an evolved Node B (eNB) priority message.

6. The system of claim 1, wherein transmission timing further comprises transmissions that are frame mapped to coordinated universal time (UTC).

7. The system of claim 6, wherein transmission timing further comprises a separate offset indicator for timing below one microsecond.

8. The system of claim 1, wherein the prioritized list of synchronization sources further comprises data indicating signaling of the timing offset in a granularity of less than cyclic prefix duration relative to global coordinated universal time (UTC).

9. The system of claim 1, wherein the timing reference between a network system timing, GNSS system timing and proximity services (ProSe) system timing is related to a common global timing reference.

10. The system of claim 1, wherein the processor is further configured to receive GNSS assistance information broadcasted by the eNB in system information blocks (SIB).

11. The system of claim 1, wherein GNSS assistance information in long term evolution positioning protocol (LPP) is reused.

12. The system of claim 11, wherein GNSS-Reference-Time data element is reused for a relationship between GNSS system time and network air-interface timing of the eNB transmission in a reference cell.

13. The system of claim 11, wherein GNSS-Reference-Location data element is reused to provide knowledge of a location to improve GNSS receiver performance.

14. The system of claim 1, wherein the processor is further configured to receive a synchronization signal or synchronization channel that carries information about a type of the synchronization source.

15. The system of any of claim 1, wherein eNB and GNSS timing is aligned and associated with common resource allocation, unambiguously defining a physical structure of resource pool configuration for data and control, once a UE acquires timing information.

16. The system of claim 1, wherein the processor is a baseband processor.

* * * * *